Jan. 30, 1968    J. E. OLSEN    3,365,773
DEBURRING TOOL
Filed Sept. 24, 1965    2 Sheets-Sheet 1
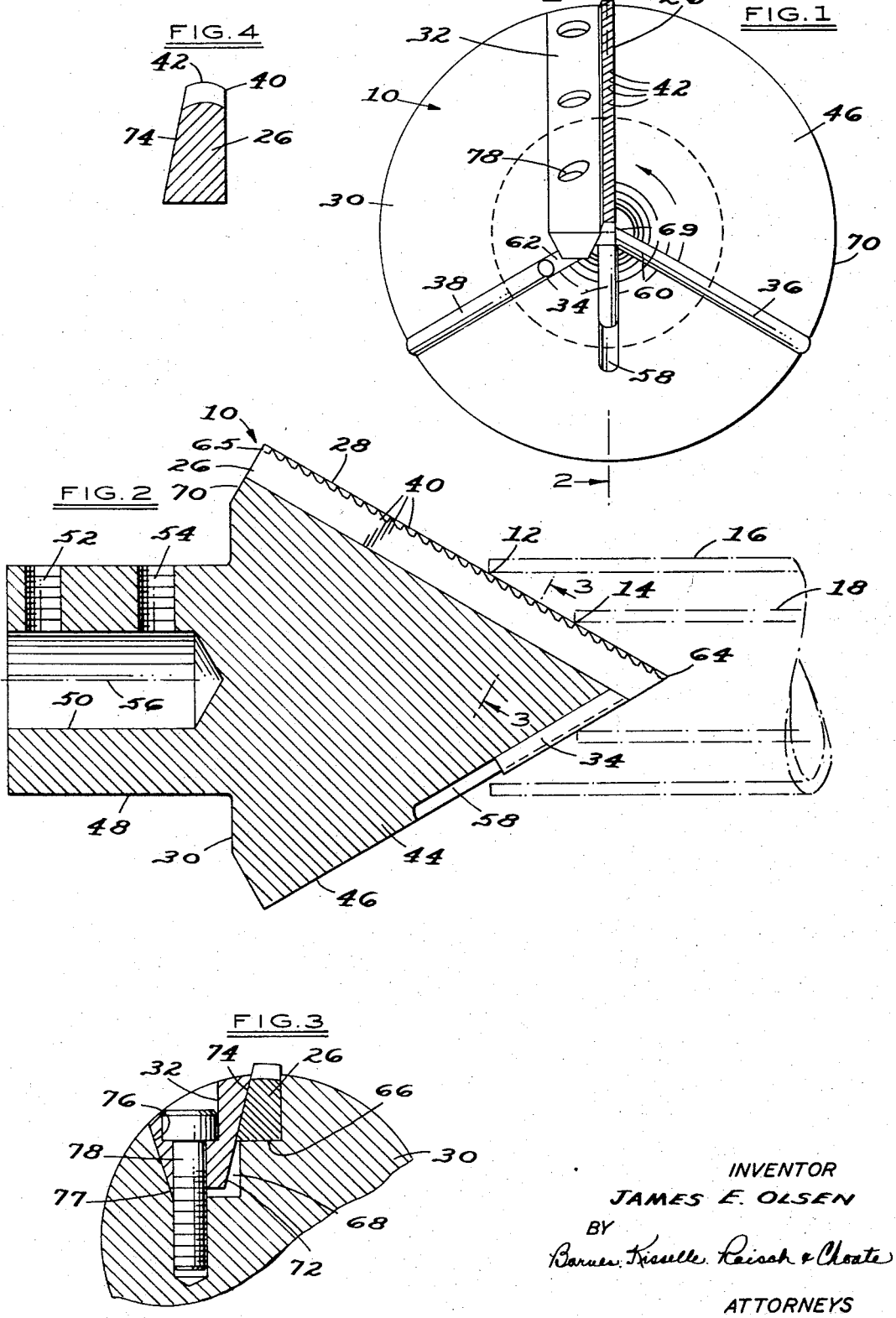
INVENTOR
JAMES E. OLSEN
BY
Barnes, Kisselle, Raisch & Choate
ATTORNEYS Jan. 30, 1968 J. E. OLSEN 3,365,773
DEBURRING TOOL
Filed Sept. 24, 1965 2 Sheets-Sheet 2
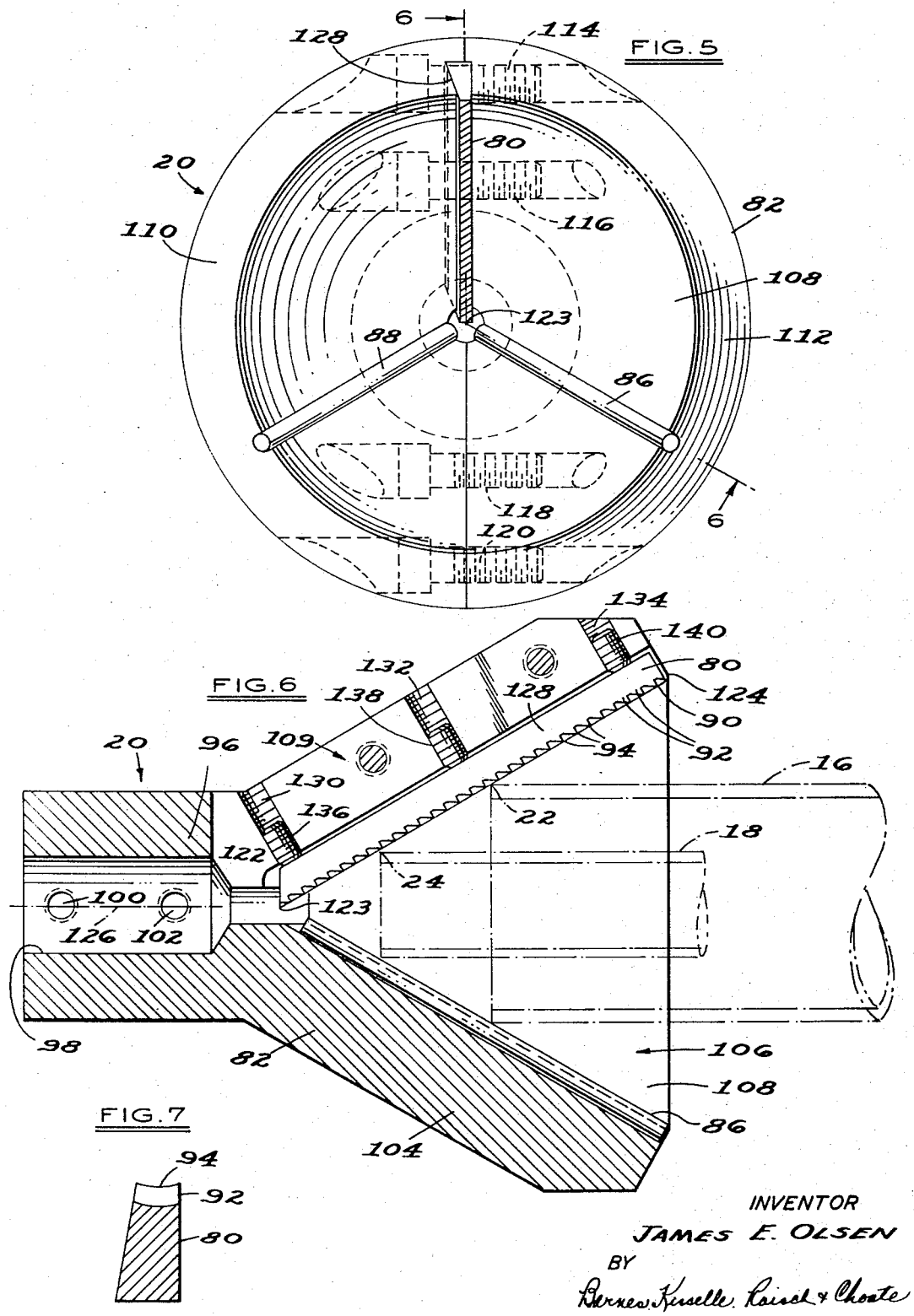
INVENTOR
JAMES E. OLSEN
BY
Barnes, Kisselle, Raisch & Choate
ATTORNEYS United States Patent Office
3,365,773
Patented Jan. 30, 1968

1

3,365,773
DEBURRING TOOL
James E. Olsen, Royal Oak, Mich., assignor to Olsen Manufacturing Company, Royal Oak, Mich., a corporation of Michigan
Filed Sept. 24, 1965, Ser. No. 489,848
4 Claims. (Cl. 29—105)

ABSTRACT OF THE DISCLOSURE

A deburring tool formed with either a conical interior or a conical exterior surface with a cutting blade removably mounted in said surface and at least two bearing strips in the bearing surface for engaging the end of a pipe, the burr of which is to be removed by the cutting blade.

---

This invention relates to deburring tools and particularly to a tool for deburring circular edges at the ends of pipes.

An object of the invention is to provide a deburring tool capable of accommodating a wide range of pipe sizes.

Another object of the invention is to provide a deburring tool with bearings which balance out radial loads on a cutter of the tool.

A further object of the invention is to provide tools specially adapted for deburring the inside edges and the outside edges at the ends of pipes.

Other objects, features and advantages of the invention will become evident from the following description taken with the accompanying drawings, in which:

FIG. 1 is an end view of a deburring tool which constitutes one embodiment of the invention.

FIG. 2 is a section taken on line 2—2 of FIG. 1.

FIG. 3 is a fragmentary sectional view taken on line 3—3 of FIG. 2.

FIG. 4 is a cross section of the cutter blade of the tool of FIGS. 1–3.

FIG. 5 is an end view of a deburring tool in accordance with another embodiment of the invention.

FIG. 6 is a section taken on line 6—6 of FIG. 5.

FIG. 7 is a cross section of the cutter blade of the tool of FIGS. 5 and 6.

The tool 10 (FIGS. 1 to 4) is designed for deburring inside edges 12 and 14 at the ends of pipes 16 and 18, and a similar tool 20 (FIGS. 5–7) is designed for deburring outside edges 22 and 24 of pipes 16 and 18. Tools 10 and 20 deburr only one pipe at a time, but two pipes are shown by broken lines in the drawings to illustrate how the inner and outer edges of pipes of different sizes may be deburred with the same tools.

Tool 10 of FIGS. 1–4 includes a cutter blade 26 having a long, slender cutting edge 28 along one side, a holder 30, a keeper 32 and bearing rods 34, 36 and 38. The cutting edge 28 of blade 26 is in the form of a plurality of successive teeth 40. Each tooth 40 is of generally triangular shape in side elevation and the sharp edges 42 at the apex of teeth 40 are oblique to the length of the blade.

Blade 26 is affixed by keeper 32 to a mounting portion 44 of holder 30, which has a conical exterior surface 46. Holder 30 also has a hub 48 with an axial bore 50 therein for receiving a rotary shaft (not shown) and tapped holes 52 and 54 for receiving screws to fasten the holder to the shaft. Upon rotation of the shaft, hub 48 rotates about its axis 56 and blade 26 revolves about axis 56 along a conical path.

Rods 34, 36 and 38 are received in recesses 58, 60 and 62 in conical surface 46 and provide bearings which slide

2 along the inner edge of a pipe as the tool rotates and counteract or balance out radial load imposed on the cutter as it cuts. This avoids transverse loads on the drive shaft. The rods may be affixed to holder 30 by means of a suitable structural adhesive. These rods each extend toward the apex of conical surface 46 in the manner of the generatrix of the cone. Blade 26 likewise is disposed as the generatrix of the cone. Rod 34 extends from the bottom side of blade 26 along conical surface 46 and is located diametrically opposite blade 26; that is, it lies in a plane which also includes blade 26 and the axis of rotation 56. Rod 38, however, terminates short of cutter 26 because keeper 32 intervenes between rod 38 and the cutter. Rod 34 provides a bearing which is engaged by smaller-sized pipes such as 16. Rod 36 may also terminate short of cutter 26 as indicated in FIG. 1.

As is shown in FIGS. 1 and 2, rods 34, 36 and 38 project radially outwardly slightly beyond conical surface 46. The apexes 42 of teeth 40 lie in the conical surface defined by the radially outermost surfaces of rods 34, 36 and 38. Teeth 40 are preferably ground by including blade 26, by means of a suitable fixture, at an angle to the axis of rotation of the grinding wheel corresponding to one half the apex angle of conical surface 46. The conical configuration of the apex edges 42 of teeth 40 is an important feature of the present invention.

Blade 26 is received on a shoulder 66 (FIG. 3) in a recess 68 which extends from the peak 69 (FIG. 1) of conical surface 46 to its base 70. The blade is retained on shoulder 66 by the keeper 32 which is also received in recess 68. Keeper 32 is a wedge block having a sloping surface 72 which contacts another sloping surface 74 on blade 26. Keeper 32 also has a sloping surface 76 contacting a similar sloping surface 77 of holder 30 at the left side of recess 68 (FIG. 3). Screws 78 pass freely through keeper 32 and are screwed into tapped holes in holder 30. As screws 78 are tightened, they pull keeper 32 down sloping surface 77, causing keeper surface 72 to wedge blade 26 against the holder to retain it on shoulder 66. Obviously, screws 78 may be withdrawn, allowing keeper 32 to be removed. Blade 26 may then be removed, for example, for sharpening or replacement purposes.

When tool 10 is mounted on a suitable spindle and rotated, the end of a pipe may be pressed against the conical end of the tool to remove the burr from around the inner circular edge of the pipe. More specifically, the apex edges 42 of teeth 40 engages the inner edge of the pipe end, for example, the edge 14 of pipe 18 in FIG. 2, and remove the burr therefrom.

The ability to accommodate pipes of different diameters results from the oblique disposition of the apex edges 42 of teeth 40 and the fact that these edges collectively define a segment of a conical surface concentric with surface 46 and coinciding with the conical surface defined by the radially outermost surfaces of rods 34, 36 and 38. Thus, regardless of whether the pipe contacts blade 26 near its tip 64 or near its opposite end 65, a smooth cutting action is obtained.

Tool 20 is similar to tool 10 but its elements are arranged differently and have somewhat different surface configurations than the corresponding elements in the embodiment of FIGS. 1–4. Blade 80 has a cutting edge 90 composed of triangularly shaped teeth 92 having sharp edges 94 at the apexes of the teeth and, like blade 26, the apex edges 94 of teeth 92 are oblique to the longitudinal axis of blade 80.

Holder 82 includes a hub 96 with an axial bore 98 and tapped holes 100, 102 for affixing the hub to a rotary shaft in the same manner as has been explained in connection with FIGS. 1–4. The mounting portion 104 of holder 82 has an internal cavity 106 defined by a conical surface 108. The holder is comprised of two sections 110 and 212 which are joined by means of screws 114, 116, 118 and 120.

Blade 80 extends along conical surface 108 from its peak 122 to its base 124. The tip 123 of blade 80 is at the axis 126 of hub 96. The apex edges 94 of teeth 92 project radially inwardly slightly from conical surface 108. When hub 96 is rotated, the cutting edge follows a conical path about axis 126.

Bearing rods 86, 88 are embedded in conical surface 108 and project radially inwardly therefrom a slight distance as is shown in FIG. 6. The apex edges 94 of teeth 92 are concave as shown in FIG. 7 and these apex edges taken collectively define a segment of a conical surface concentric with surface 108 and spaced slightly inwardly thereof and containing the radially innermost surfaces of bearing rods 86, 88.

A pipe 16 or 18 may be placed in cavity 106 coaxial with the holder and with its outer edge 22 or 24 in contact with teeth 92. As the teeth revolve, they cut into the outside edge at the end of the pipe and remove any burrs which may be present on that edge.

The bearing rods 86 and 88 slide along the outside edge at the end of the pipe at points symmetrically disposed on opposite sides of the cutting edge such that rods 86 and 88 balance out radial loads imposed on blade 80 during cutting. Since there is no keeper in this embodiment, there is room for both bearing rods to extend along the full length of surface 108. Rods 86 and 88 are received in recesses in surface 108 and are bonded thereto by means of adhesive.

Blade 80 is received in a recess 109 which extends through mounting portion 104 and opens to both the inside and the outside of the mounting portion. Blade 80 has a sloping surface 128 in contact with a sloping surface of mounting portion 104 at one side of the recess (FIG. 5). The surfaces of holder 104 on both sides of this recess are tapped at 130, 132 and 134 to receive set screws 136, 138 and 140, and these set screws may be tightened to force blade 80 radially inward, thus wedging its sloping surface 128 against the adjoining sloping surface of holder 104. When set screws 136, 138 and 140 are removed from the holder, blade 80 may be withdrawn to the outside of the holder.

As explained previously with respect to tool 10, tool 20 is likewise adapted to accommodate pipes of widely varying diameter because of the oblique inclination of teeth 92 and the conical shape of the apex edges 94.

I claim:

1. A tool for deburring circular edges at the end of pipes comprising a shank adapted to be connected to a rotary shaft, said shank having at one axial end thereof a body provided with a conical surface concentric with the axis of rotation of the shank, means forming a groove in said conical surface parallel to the generatrix of the cone, an elongate blade mounted in said groove, said blade having a cutting edge extending parallel to said conical surface and defined by a series of teeth which are of triangular shape and cross section, said teeth having sharp apex edges inclined obliquely to the longitudinal axis of the blade, said groove and blade having an axial extent such that the cutting edge at one end of the blade terminates on the axis of rotation of the shank and defines the vertex of a cone generated by said cutting edge, said conical surface containing two additional grooves therein spaced circumferentially from said blade, a bearing strip in each of said additional grooves, each of said bearing strips terminating at one end closely adjacent said one end of the blade so that the tool is capable of deburring pipes of very small diameter.

2. A deburring tool as called for in claim 1 wherein the conical surface of the body forms the exterior surface thereof, said cutting edge forming the radially outer surface of the blade, said one end of the blade being defined by said cutting edge and an end surface intersecting said cutting edge and inclined thereto at the vertex angle of said cone, one of said bearing strips being disposed diametrically oppposite said blade and abutting the radially inner side of the blade at said one end thereof.

3. A deburring tool as called for in claim 2 wherein the radially outer surface of said one bearing strip forms a continuation of said end surface of the blade.

4. A deburring tool as called for in claim 3 wherein said blade groove is substantially wider than the thickness of the blade, a retainer bar in said blade groove generally co-extensive with said blade and engaging one side of the blade to retain the blade in the groove, a fourth groove in said conical surface, said blade groove, said fourth groove and the other of said two grooves being generally equally angularly spaced around said conical surface and a bearing strip in said fourth groove terminating at one end closely adjacent said retainer and at its opposite end adjacent the base of the cone formed by said conical surface.

References Cited

UNITED STATES PATENTS

| | | | |
|---|---|---|---|
| 860,011 | 11/1905 | Smart | 77—73 |
| 1,662,936 | 3/1928 | Philipp | 77—73 X |
| 1,946,416 | 2/1934 | Seiler | 29—103 X |
| 2,242,821 | 5/1941 | Fanslow | 77—73 |
| 3,195,377 | 7/1965 | Frank | 77—73 |

FOREIGN PATENTS

| | | |
|---|---|---|
| 155,047 | 9/1951 | Australia. |

HARRISON L. HINSON, *Primary Examiner.*